(12) United States Patent
Tochio

(10) Patent No.: US 9,075,769 B2
(45) Date of Patent: Jul. 7, 2015

(54) COMMUNICATION CONTROL DEVICE AND COMMUNICATION CONTROL METHOD

(71) Applicant: FUJITSU LIMITED, Kawasaki-shi, Kanagawa (JP)

(72) Inventor: Yuji Tochio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 139 days.

(21) Appl. No.: 13/888,514

(22) Filed: May 7, 2013

(65) Prior Publication Data

US 2014/0025985 A1  Jan. 23, 2014

(30) Foreign Application Priority Data

Jul. 18, 2012  (JP) .................................. 2012-160036

(51) Int. Cl.
*G06F 11/20*  (2006.01)
*H04L 12/437*  (2006.01)
*H04L 12/42*  (2006.01)

(52) U.S. Cl.
CPC .......... *G06F 11/2002* (2013.01); *H04L 12/437* (2013.01); *H04L 2012/421* (2013.01)

(58) Field of Classification Search
CPC ............ G06F 11/2002; G06F 11/2028; G06F 11/079; G06F 11/0703; G06F 11/2007; G06F 11/2025; G06F 11/2033; H04L 2012/421; H04L 12/437; H04L 45/28; H04L 45/22; H04L 45/02
See application file for complete search history.

(56) References Cited

U.S. PATENT DOCUMENTS

| 6,259,837 | B1* | 7/2001 | de Boer et al. ................. 385/24 |
| 6,278,689 | B1 | 8/2001 | Afferton et al. |
| 6,324,162 | B1* | 11/2001 | Chaudhuri .................... 370/225 |
| 6,717,922 | B2* | 4/2004 | Hsu et al. ...................... 370/258 |
| 7,024,591 | B2* | 4/2006 | Moody et al. .................. 714/43 |
| 7,095,714 | B2 | 8/2006 | Suetsugu et al. |
| 7,242,861 | B2 | 7/2007 | Sato et al. |
| 7,324,440 | B2 | 1/2008 | Takagi et al. |
| 2005/0207348 | A1* | 9/2005 | Tsurumi et al. ................ 370/241 |
| 2011/0222396 | A1* | 9/2011 | Tochio .......................... 370/222 |
| 2014/0301185 | A1* | 10/2014 | Chen et al. .................... 370/225 |
| 2014/0321261 | A1* | 10/2014 | Lee et al. ....................... 370/216 |

FOREIGN PATENT DOCUMENTS

| JP | 11-331227 | 11/1999 |
| JP | 2002-009802 | 1/2002 |

OTHER PUBLICATIONS

Great Britain Search Report dated Nov. 11, 2013 for corresponding Great Britain Application 1308293.8.

* cited by examiner

*Primary Examiner* — Nadeem Iqbal
(74) *Attorney, Agent, or Firm* — Fujitsu Patent Center

(57) ABSTRACT

A connection node is included in a connecting part of a plurality of rings in a ring network. The connection node includes a failure detecting unit, an optical-signal processing unit, an ODU switch, and an optical-signal processing unit. The failure detecting unit detects failure in the connecting part. The optical-signal processing unit receives data transmitted from another node on a ring to which the connection node belongs. Upon detection of the failure, the ODU switch determines whether to pass the data or return the data in reverse direction from the connection node depending on a destination to transfer the received data, and sets a transmission path of the data based on a result of the determination. The optical-signal processing unit transfers the data in accordance with the set transmission path.

5 Claims, 17 Drawing Sheets

FIG.8A

| PSI/TS | LO ODU TYPE | ODU PATH NAME | DESTINATION TO TRANSFER IN SWITCHING | | | | 12a |
| --- | --- | --- | --- | --- | --- | --- | --- |
| | | | (1) NORMAL TIME | (2) FAILURE ON RING R2 | (3) FAILURE IN N3 | (4) FAILURE IN LINK L2 | |
| 1 | $ODUk_{Xi}$ | PATH X1 | →N3 | →N3 | →N6$_{(BLSR)}$ | →N3 | |
| 2 | $ODUk_{Yi}$ | PATH Y1 | →N2 | →N2 | →N2 | →N3 | |
| 3 | $ODUk_{Xi}$ | PATH X1 | →N3 | →N3 | →N6$_{(BLSR)}$ | →N3 | |
| : | : | : | : | : | : | : | |
| i | $ODUk_{Zi}$ | PATH Z1 | →N1 | →N1 | →N2 | →N1 | |
| : | : | : | : | : | : | : | |
| n/2 | $ODUk_{Zi}$ | PATH Zi | →N1 | →N1 | →N1 | →N1 | |
| n/2+1 | : | : | UNUSED | →N3$_{(BLSR)}$ | N6, N2, N1 DETERMINE DESTINATION TO TRANSFER BY NOTIFICATION FROM N3 | UNUSED | |
| : | : | : | : | : | | : | |
| n | : | : | UNUSED | →N3$_{(BLSR)}$ | | UNUSED | |

FIG.8B

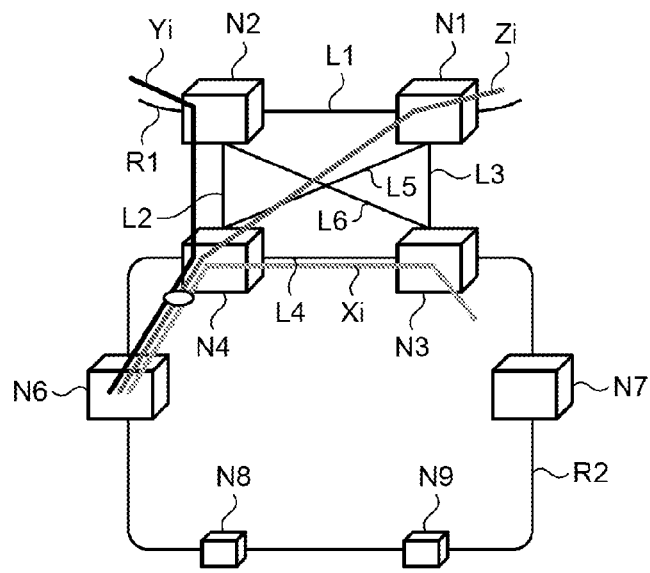

FIG.9A

| PSI/TS | LO ODU TYPE | ODU PATH NAME | DESTINATION TO TRANSFER IN SWITCHING | | | |
|---|---|---|---|---|---|---|
| | | | (1) NORMAL TIME | (2) FAILURE ON RING R2 | (3) FAILURE IN N3 | (4) FAILURE IN LINK L2 |
| 1 | ODUk$_x$ | PATH X1 | N3 | N3 | →N6$_{(BLSR)}$ | N3 |
| 2 | ODUk$_y$ | PATH Y1 | N2 | N2 | N2 | N3 |
| 3 | ODUk$_x$ | PATH X1 | N3 | N3 | →N6$_{(BLSR)}$ | N3 |
| ⋮ | ⋮ | ⋮ | ⋮ | ⋮ | ⋮ | ⋮ |
| i | ODUk$_z$ | PATH Z1 | N1 | N1 | N2 | N1 |
| ⋮ | ⋮ | ⋮ | ⋮ | ⋮ | ⋮ | ⋮ |
| n/2 | ODUk$_x$ | PATH Yi | N1 | N1 | N1 | N1 |
| n/2+1 | APPLY INFORMATION D1 IN FIG. 9B | | UNUSED | N3$_{(BLSR)}$ | APPLY INFORMATION D2 IN FIG. 9B | UNUSED |
| ⋮ | | | ⋮ | ⋮ | | ⋮ |
| n | | | UNUSED | N3$_{(BLSR)}$ | | UNUSED |

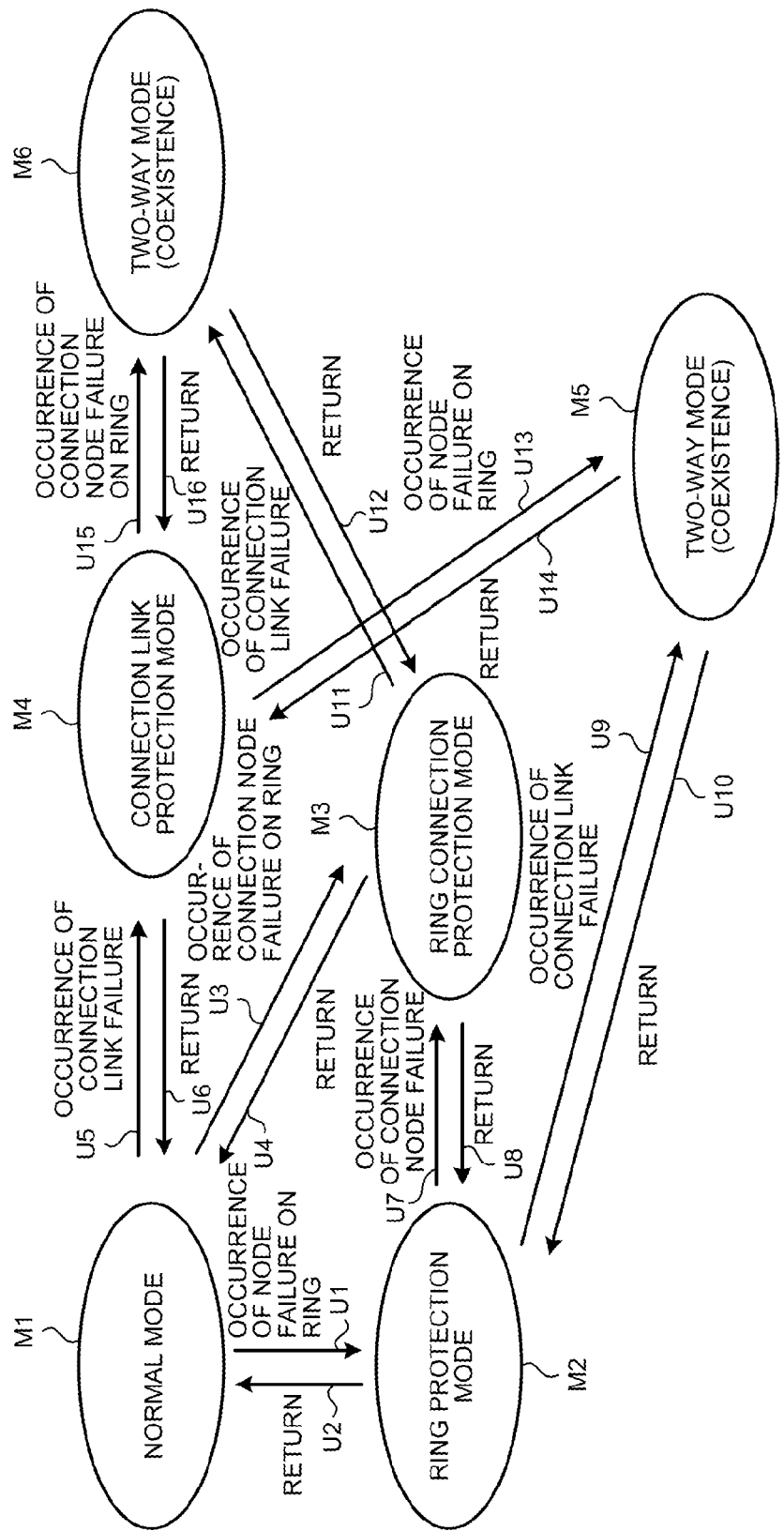

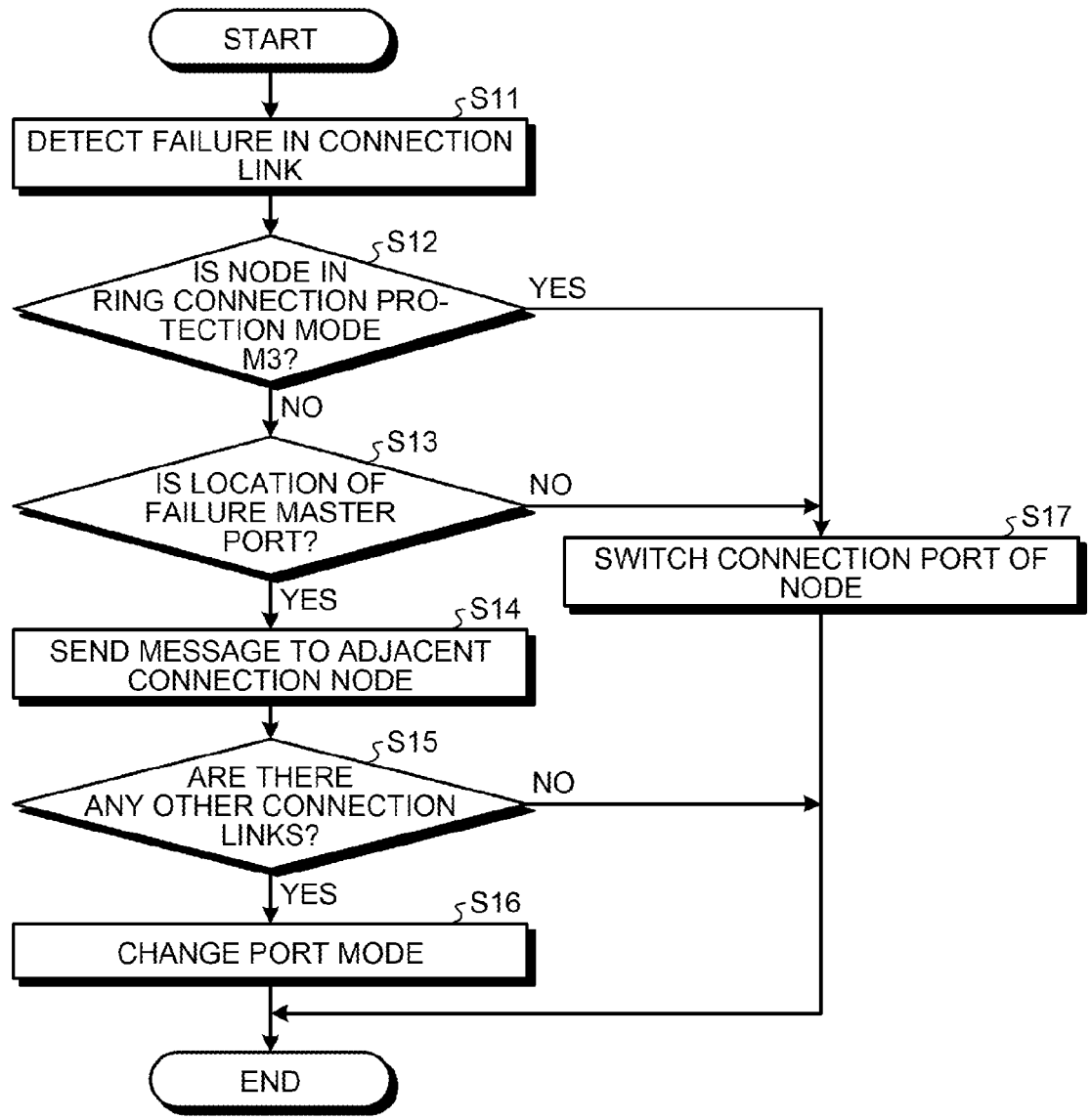

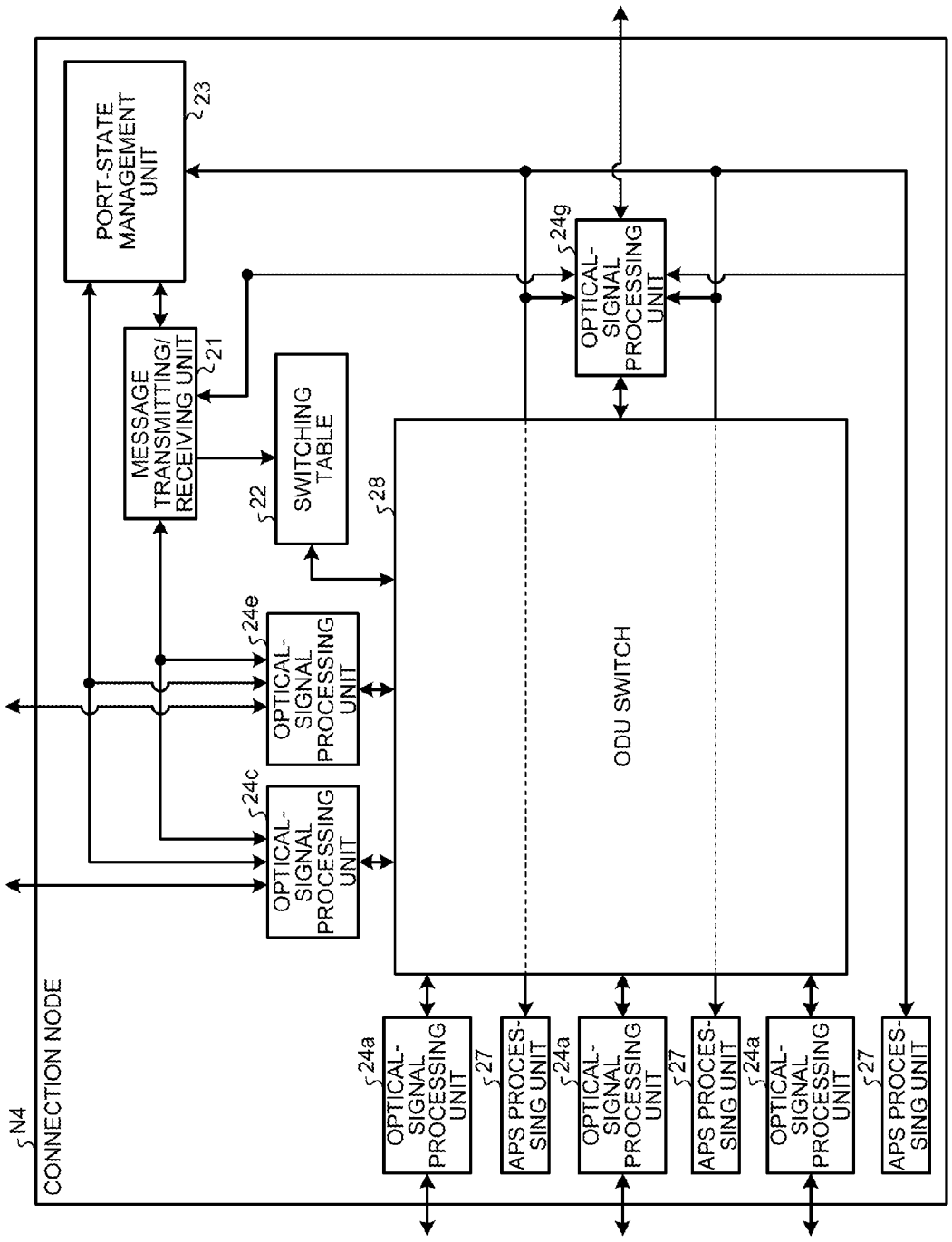

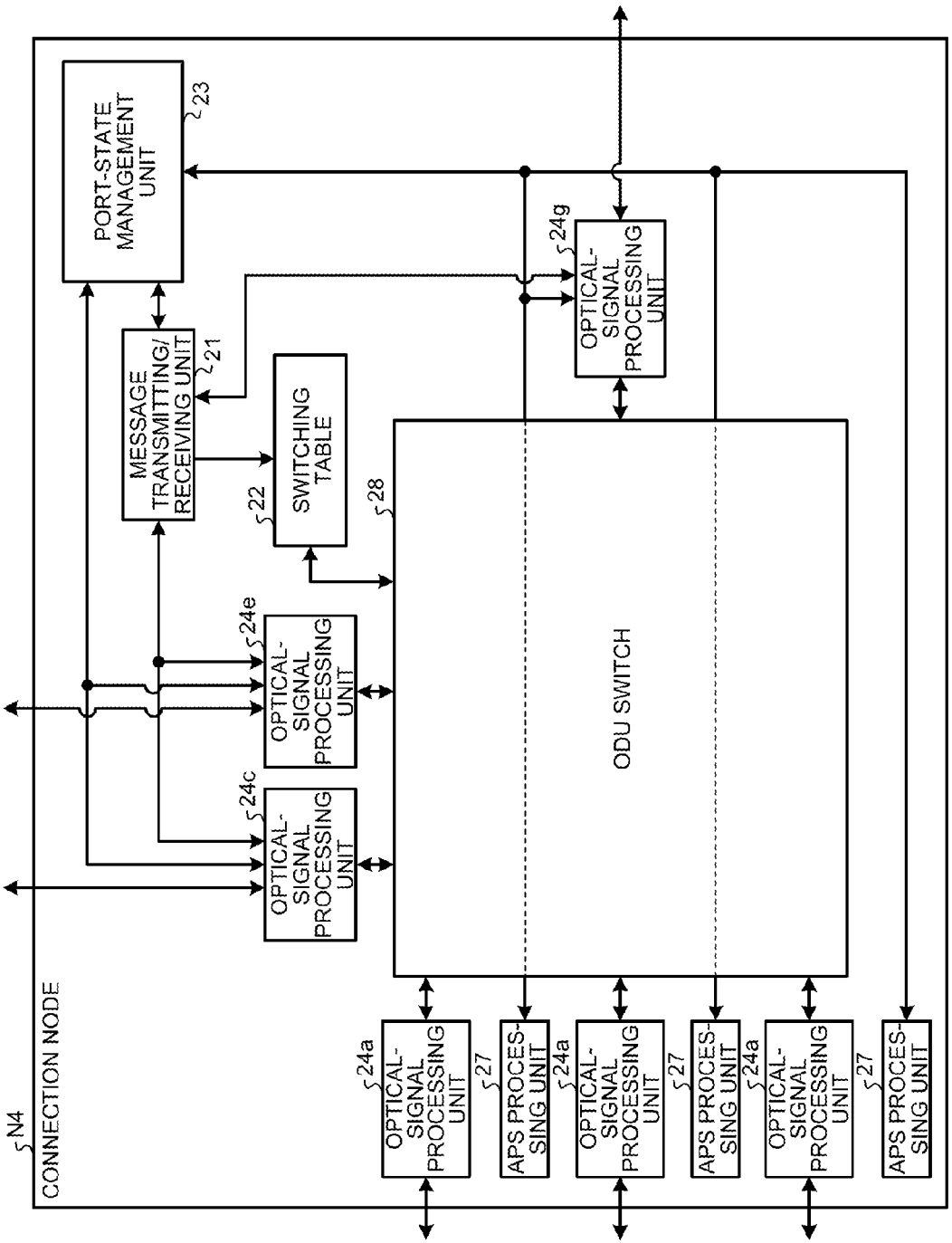

COMMUNICATION CONTROL DEVICE AND COMMUNICATION CONTROL METHOD

CROSS-REFERENCE TO RELATED APPLICATION

This application is based upon and claims the benefit of priority of the prior Japanese Patent Application No. 2012-160036, filed on Jul. 18, 2012, the entire contents of which are incorporated herein by reference.

FIELD

The embodiment discussed herein is related to a communication control device and a communication control method.

BACKGROUND

Conventionally, in optical transport networks (OTN) using optical fibers as transmission media, a ring network in which a plurality of nodes are connected in a ring shape has become common. This topology of a network can be expanded by interconnecting rings; however, on the occurrence of a node or line failure, to curb the influence of the failure, 8-shaped expansion by connection of single nodes is not usually performed. Usually, for example, in view of the ring protection recommendation G.873.2 defined by International Telecommunication Union-Telecommunication standardization sector (ITU-T), an expansion method which is highly redundant with respect to failure is adopted. Examples of the method include a shared link that connects rings is formed using two nodes and an interconnection link that further improves the redundancy using four nodes arranged in a rectangle shape.

[Patent document 1] Japanese Laid-open Patent Publication No. 11-331227

[Patent document 2] Japanese Laid-open Patent Publication No. 2002-009802

Out of the above-mentioned two types of expansion methods (links), especially, the latter interconnection link is standardized, for example, in ITU-T G.842, and is capable of expansion of a ring network while achieving Bi-directional Line Switched Ring (BLSR)-based protection. However, this method has a problem that nodes other than connection nodes also have to create a table for path line or control traffic to an adjacent ring. This problem can be addressed by, for example, in four connection nodes, by adopting a configuration that links directly connecting diagonally opposite nodes are formed (a so-called "X-shaped configuration"); however, in the above-mentioned ITU-T G.842, a new issue arises. That is, when a network adopts the configuration, there is an increase in the number of branches of a selector or the number of nodes in the network, or the nodes have to include several types of selectors. As a result, the state management of a connecting part (connection nodes or links between nodes) between rings becomes complicated.

SUMMARY

According to an aspect of the embodiments, a communication control device that is included in a connecting part of a plurality of rings in a ring network includes: a detecting unit that detects failure in the connecting part; a receiving unit that receives data transmitted from another communication control device on a ring to which the communication control device belongs; a setting unit that determines, when the failure has been detected by the detecting unit, whether to pass the data or return the data in reverse direction from the communication control device depending on a destination to transfer the data received by the receiving unit, and sets a transmission path of the data based on a result of the determination; and a transfer unit that transfers the data in accordance with the transmission path set by the setting unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8A is a diagram illustrating an example of data stored in a switching table when traffic has been input from a connection node N6 to a connection node N4;

FIG. 8B is a diagram illustrating paths set when the traffic has been input from the connection node N6 to the connection node N4;

FIG. 9A is a diagram illustrating an example of data stored in a switching table on the occurrence of failure in a connection node N3;

FIG. 10 is a state transition diagram based on switching tables of the connection node;

FIG. 11 is a flowchart for explaining the operation of the connection node;

FIG. 15 is a block diagram illustrating a configuration of a connection node according to the variation 2;

FIG. 17 is a block diagram illustrating a configuration of a connection node according to the variation 3.

DESCRIPTION OF EMBODIMENTS

Preferred embodiments will be explained with reference to accompanying drawings.

Incidentally, the communication control device and communication control method according to the present invention are not limited to the embodiment described below.

Figure 1:
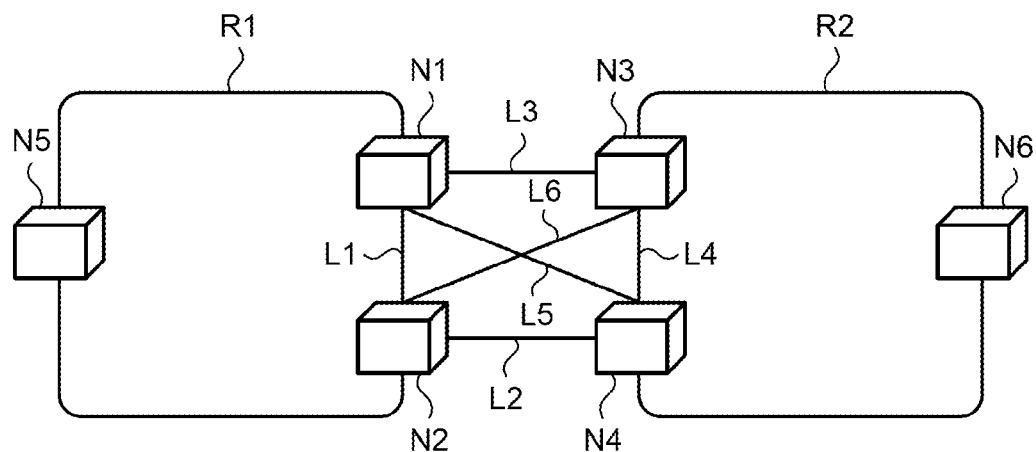
FIG. 1 is a diagram illustrating the topology of rings in a ring network.

First, a network assumed in the present embodiment is illustrated in FIG. 1. FIG. 1 is a diagram illustrating the topology of rings R1 and R2 in a ring network RN. As illustrated in FIG. 1, the ring network RN has two rings R1 and R2. The ring R1 includes connection nodes N1 and N2 and a node N5 on a line thereof; the ring R2 includes connection nodes N3 and N4 and a node N6 on a line thereof. In a connecting part between the rings R1 and R2, the connection nodes N1 to N4 are connected via links L1 to L6. Especially, the link L5 connecting between the diagonally opposite connection nodes N1 and N4 and the link L6 connecting between the diagonally opposite connection nodes N2 and N3 cross obliquely in an X-shaped configuration, thereby making the connecting part redundant. By adopting the above-described configuration, the ring network RN achieves the BLSR traffic (a path of an ODU (Optical Data Unit)) transmission without affecting an adjacent node or a link of an adjacent ring.

Figure 2:
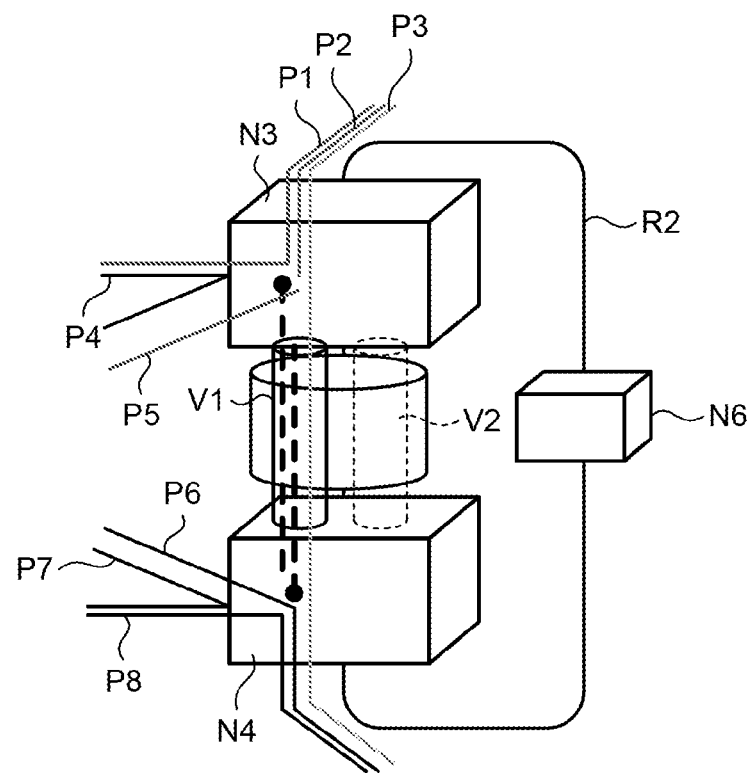
FIG. 2 is a diagram illustrating a virtual link formed between connection nodes.

Subsequently, FIG. 2 is a diagram illustrating a virtual link V1 formed between the connection nodes N3 and N4. In the ring network RN, a traffic band leading from the connection nodes N3 and N4 to the ring R1 can be estimated to be all traffic bands available to the connection nodes N3 and N4. Therefore, as illustrated in FIG. 2, the virtual link V1 is provided as shared protection in a band obtained by subtracting a traffic band closed within the ring R2 from the traffic band. The virtual link V1 is formed within the link L4 between the connection nodes N3 and N4 set by the BLSR method, so the virtual link V1 does not affect the ring protection. Incidentally, there is described the connection nodes N3 and N4 as an example; also, in redundancy between the connection nodes N1 and N2, a virtual link can be formed.

Figure 3A:
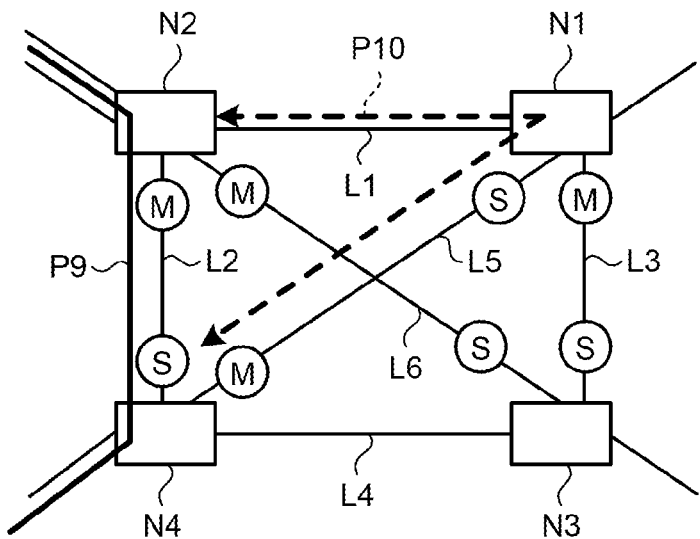
FIG. 3A is a diagram for explaining a method of setting a link redundant path between a master and a slave.

FIG. 3A is a diagram for explaining a method of setting a link redundant path between a master and a slave. In FIG. 3A, circled "M" indicates that the connection node is a master node in relation with a linked connection node. Likewise, circled "S" indicates that the connection node is a slave node in relation with a linked connection node. Whether each of the connection nodes N1 to N4 is a master node or not is relatively determined from relations with the other linked connection nodes, and can be arbitrarily changed according to a network environment and the traffic state. For example, the connection node N1 is a master node in relation with the connection node N3; however, the connection node N1 is a slave node in relation with the connection node N4. Furthermore, the connection node N4 is a master node in relation with the connection node N1; however, the connection node N4 is a slave node in relation with the connection node N2.

In FIG. 3A, let's assume that a failure has occurred, for example, in the link L2 between the connection nodes N2 and N4. In this case, as a path for the connection node N2 to perform traffic transmission to the connection node N4, there are at least two paths: a path passing through the connection node N1 (N2-N1-N4) and a path passing through the connection node N3 (N2-N3-N4). In the present embodiment, as described above, the connection node N2 is set to a master in relation between the connection nodes N2 and N4. Accordingly, the former path passing through the connection node N1 on the side of the connection node N2 (the other connection node N1 on the ring R1 to which the connection node N2 belongs) is selected. Therefore, the connection node N2 exchanges information requested for the setting of a redundant path with the connection nodes N1 and N4. Furthermore, the connection nodes N2, N1, and N4 each create a table requested for the execution of traffic transmission using the set redundant path. Incidentally, the setting of a link redundant path can be the setting by signaling on the link or the setting via an NMS (Network Management System).

Figure 3B:
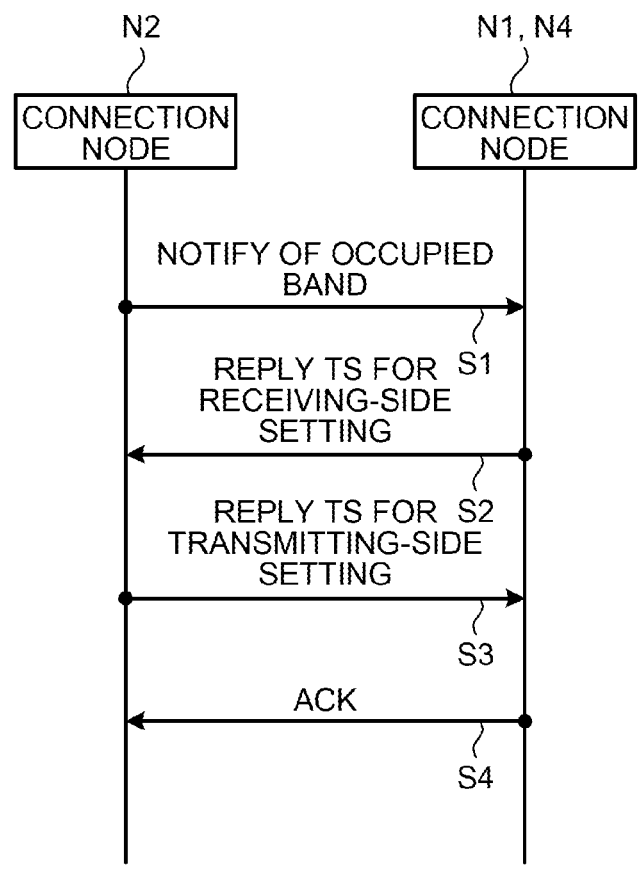
FIG. 3B is a sequence diagram for explaining the operations of connection nodes in the setting of the link redundant path between the master and the slave.

FIG. 3B is a sequence diagram for explaining the operations of the connection nodes N2, N1, and N4 in the setting of a link redundant path between the master and the slave. At S1, a message transmitting/receiving unit 11 of the connection node N2 notifies the connection nodes N1 and N4 of an occupied band by using a TS (Tributary Slot) defined in ITU-T G.709. When having received the notification, respective message transmitting/receiving units 11 of the connection nodes N1 and N4 reply a TS for the receiving-side setting (S2). At S3, in a manner similar to S2, the message transmitting/receiving unit 11 of the connection node N2 replies a TS for the transmitting-side setting. Then, when having received the reply, the message transmitting/receiving units 11 of the connection nodes N1 and N4 reply ACK (acknowledgment) (S4). Accordingly, a link redundant path P10 passing through the connection node N1 is established between the connection nodes N2 and N4. Incidentally, there is described the link L2 between the connection nodes N2 and N4 as an example; also, with respect to the link L3 between the connection nodes N1 and N3, a link redundant path can be set by the same method.

As described above, a communication control system 1 is capable of the variable master/slave settings of the connection nodes N1 to N4, thereby avoiding heavy concentration of traffics to a certain connection node. As a result, uneven distribution of the load in the system can be avoided.

Figure 4:
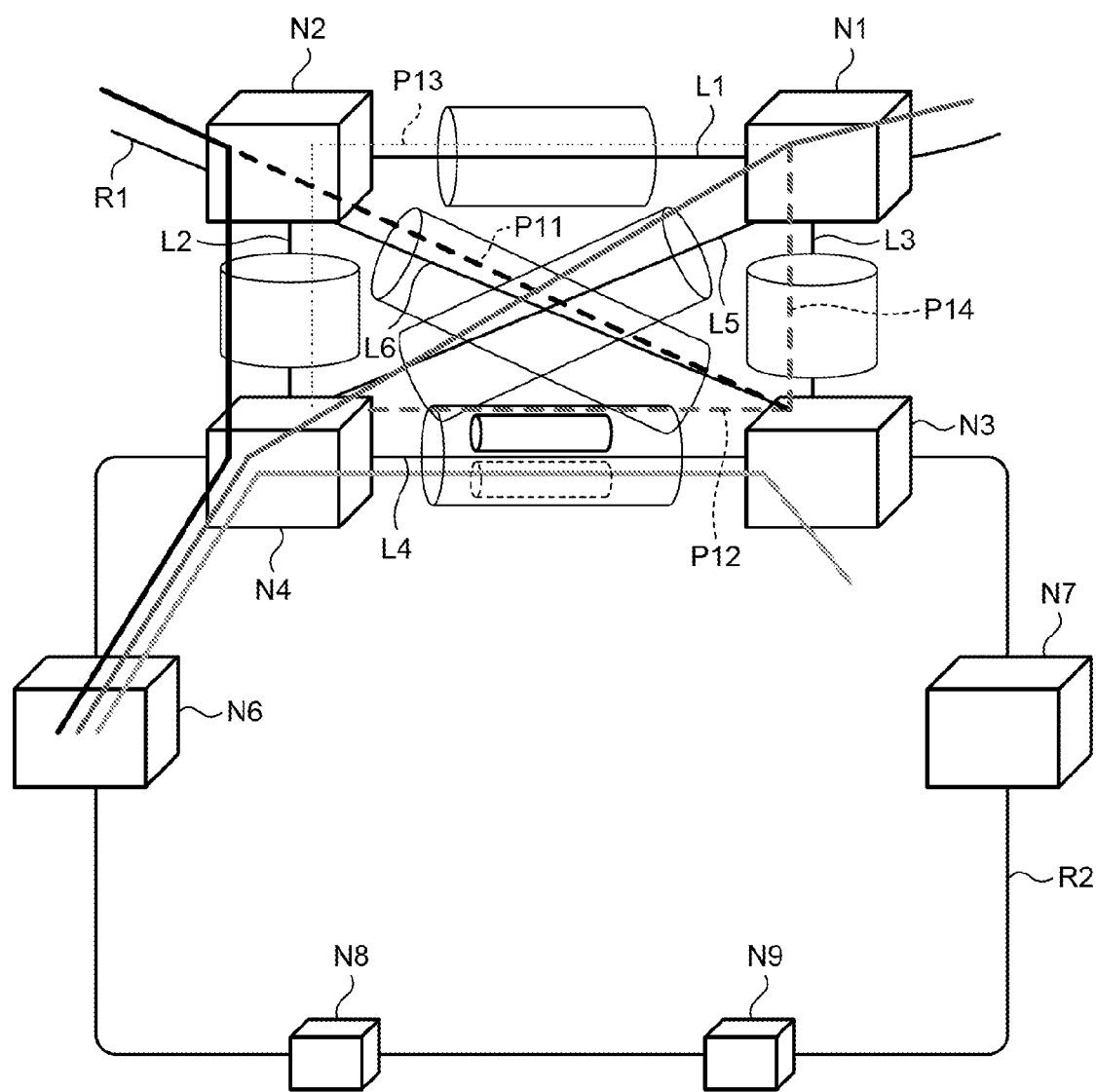
FIG. 4 is a diagram illustrating a redundant path set when a connection node has received traffic.

Subsequently, the redundant setting method is further explained on the assumption that all the links L1 to L6 of the connecting part have the same band. FIG. 4 is a diagram illustrating a redundant path set when the connection node N4 has received traffic. Here, the connection node N4 is a master node with respect to the connection node N2, and is a slave node with respect to the connection node N1. As illustrated in FIG. 4, on the occurrence of failure in the connection node N4, a path P11 is set up between the connection nodes N2 and N3. Furthermore, on the occurrence of failure in the link L2, a path P12 passing through the connection node N3 on the side of the connection node N4 which is a master node is set up. Moreover, on the occurrence of failure in the link L5, a path P13 passing through the connection nodes N4-N2-N1 or a path P14 passing through the connection nodes N4-N3-N1 is set up. At this time, in accordance with the above-described BLSR processing, the link L4 between the connection nodes N3 and N4 provides a half of the band for protection of the ring R2. On the other hand, the link L4 provides the other half of the band for a redundant path passing through the connection nodes N4-N3-N2 and a redundant path passing through the connection nodes N3-N4-N1. Namely, the link L4 becomes a shared link shared by the ring R2 and the connection nodes N1 to N4.

Figure 5:
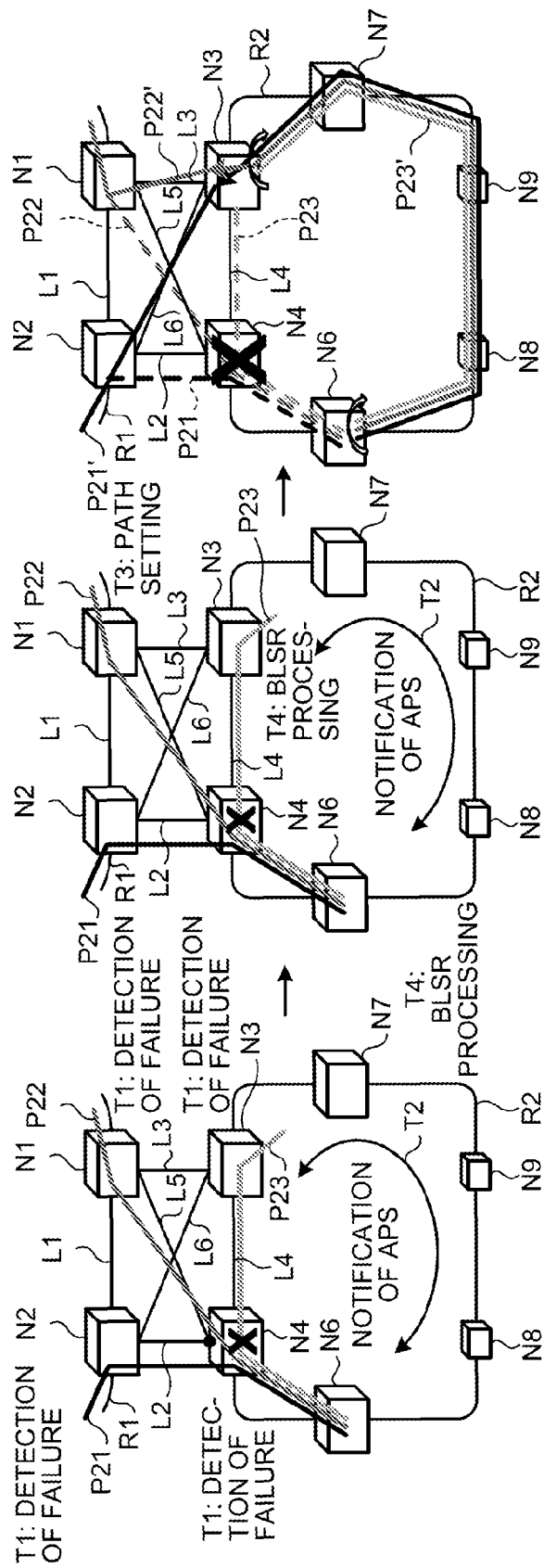
FIG. 5 is a diagram for explaining how a redundant path is provided in the event of a node failure.

FIG. 5 is a diagram for explaining how a redundant path is provided in the event of a node failure. As illustrated in FIG. 5, when the connection nodes N1 to N3 and the on-ring node N6 have detected a failure in the connection node N4 (T1), a failure notification message is transmitted/received between the adjacent connection nodes N3 and N6 on the same ring R2 as the connection node N4 (T2). This enables return communication between the connection nodes N3 and N6. The failure notification message is, for example, an APS (Automatic Protection Switching) message of an OTN ring defined in ITU-T G.873.2. Upon detection of a node failure in the connection node N4 or receipt of a failure notification message, the connection node N3 provides redundancy of the connecting part between the rings R1 and R2. Incidentally, the chronological order of the failure detection at T1 and the message receiving at T2 can be shuffled in a random order.

At T3, the connection node N1 sets a protection path on the side of the connection node N1 out of protection paths between the connection nodes N1 and N3, and the connection node N2 sets a protection path on the side of the connection node N2 out of protection paths between the connection nodes N2 and N3. Likewise, the connection node N3 sets a protection path on the side of the connection node N3 out of the protection paths between the connection nodes N1 and N3 and a protection path on the side of the connection node N3 out of the protection paths between the connection nodes N2 and N3. Furthermore, the BLSR processing is also executed in the connection nodes N3 and N6 (T4), so, for example, in the connection node N3, traffic control of transferring a signal addressed to the connection node N4 to a connection node N7 becomes possible. Likewise, also in the connection node N6, bidirectional traffic control of transferring a signal addressed to the connection node N4 in which the failure has occurred to a connection node N8 becomes possible. Incidentally, the chronological order of the path setting at T3 and the BLSR processing at T4 can be shuffled in a random order.

As a result of the above-described control, paths P21, P22, and P23 are changed to new redundant paths P21', P22', and P23'. Namely, the communication control system 1 makes control of switching paths between the connection node N4 in which the failure has occurred and the connection nodes N2 and N1 to paths between the connection node N3 and the connection nodes N2 and N1 by the path setting means illustrated in FIG. 4. Additionally, as the ring protection operation, the connection node N3 processes traffics towards L2 and L5 input through the protection paths on the ring R2, and transfers the traffics to the connection nodes N2 and N1, respectively. As described above, when the surrounding nodes N1 to N3 and N6 have detected a failure in the connection node N4 which potentially spreads to the ring R1, a redundant path is provided to the connecting part including the connection node N4 based on a result of the detection.

Figure 6:
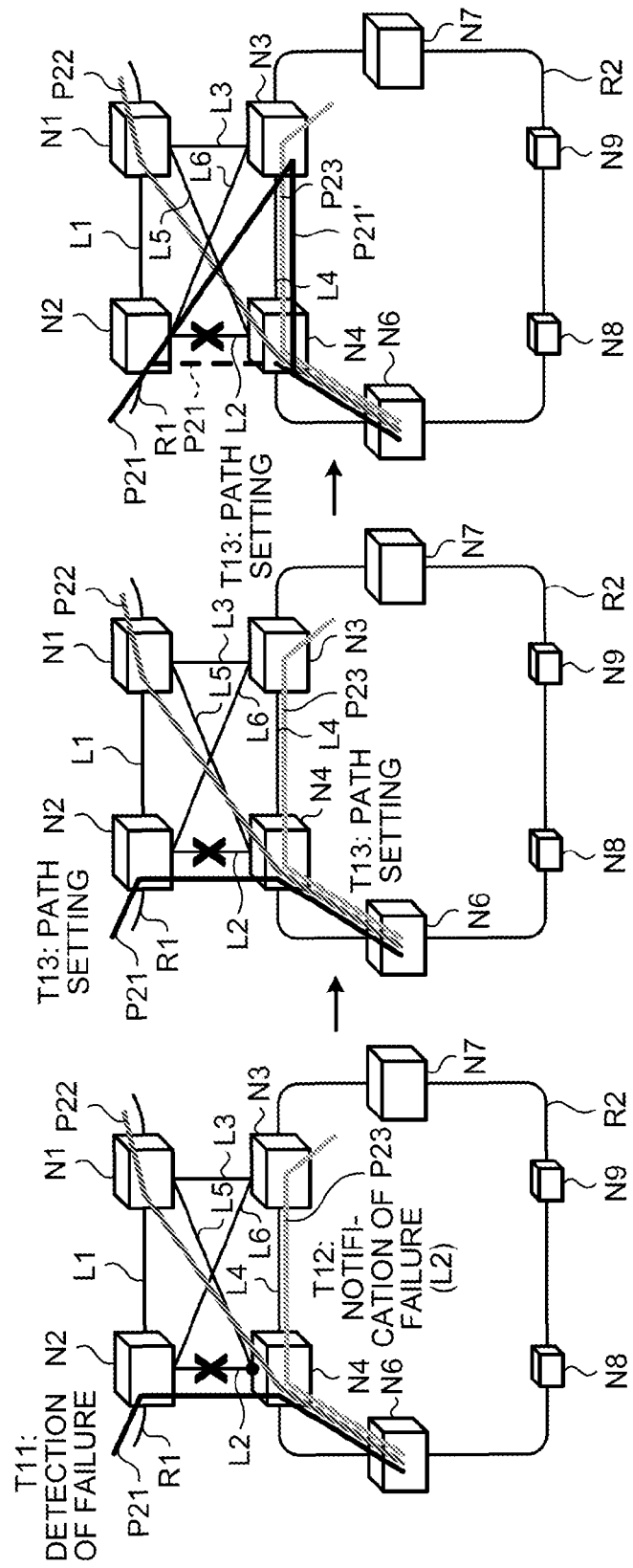
FIG. 6 is a diagram for explaining how a redundant path is provided in the event of a link failure.

FIG. 6 is a diagram for explaining how a redundant path is provided in the event of a link failure. As illustrated in FIG. 6, when the connection node N2 has detected a failure in the link L2 between the connection nodes N2 and N4 (T11), the connection node N4 notifies the connection node N3 on the same ring R2 as the master-side connection node N4 of the failure in the link L2 (T12). Incidentally, in the event of a link failure, unlike a node failure, the return control is not performed, so there is no APS message transmitted/received.

At T13, the connection node N2 sets a protection path on the side of the connection node N2 out of protection paths between the connection nodes N2 and N3, and the connection node N4 sets a protection path on the side of the connection node N4 out of protection paths between the connection nodes N4 and N3. Likewise, the connection node N3 sets a protection path on the side of the connection node N3 out of the protection paths between the connection nodes N3 and N2 and a protection path on the side of the connection node N3 out of the protection paths between the connection nodes N3 and N4.

As a result of the above-described control, a traffic path between the connection nodes N4 and N2 is changed to a redundant path passing through the connection nodes N4-N3-N2. At this time, the connection node N2 only has to perform the normal operation based on a result of the detection of the link 2 failure. As described above, when the surrounding node N2 has detected a failure in the connection node N4 which potentially spreads to the ring R1, a redundant path is provided to the connecting part including the connection node N4 based on a result of the detection.

Figure 7:
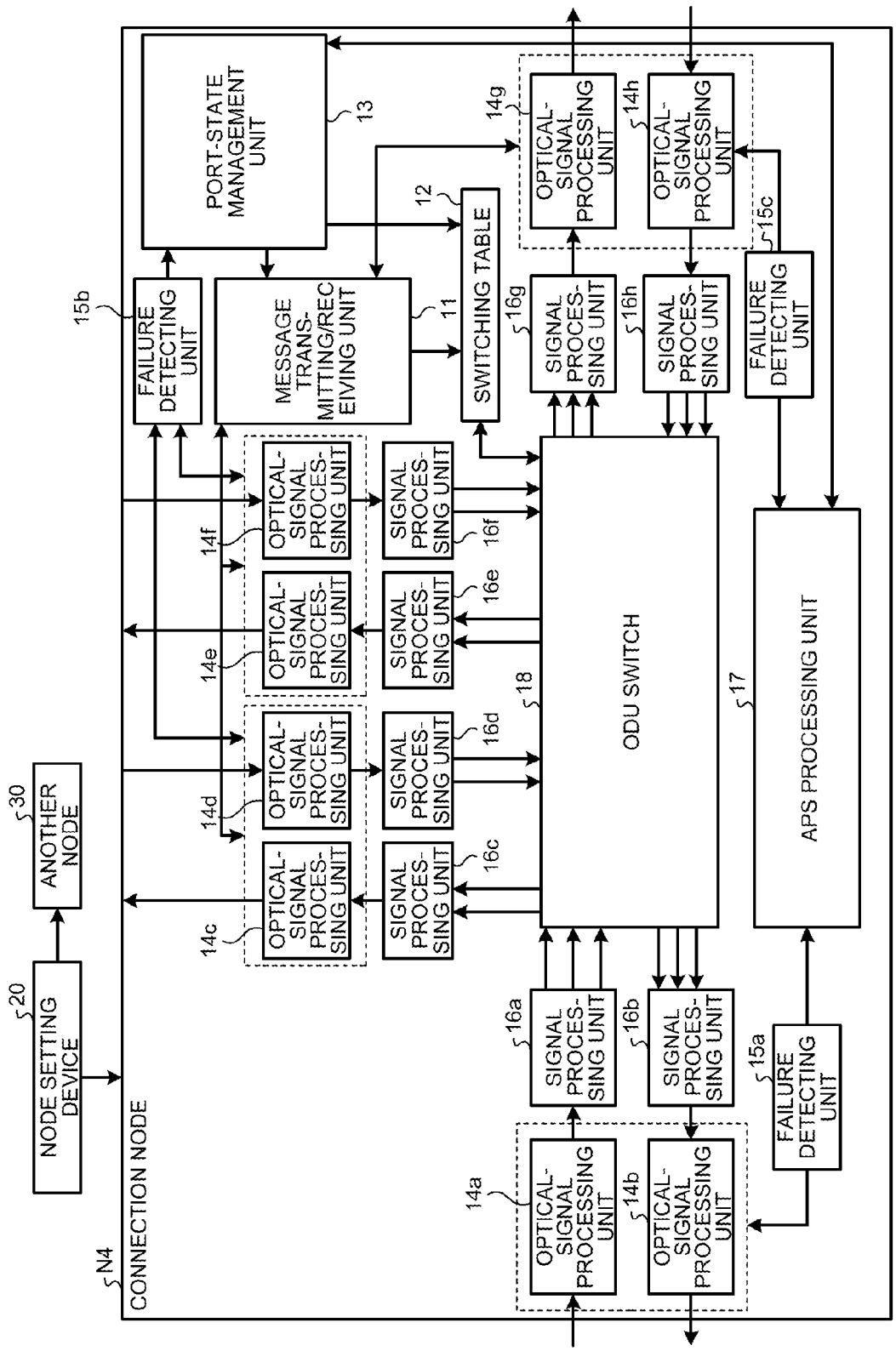
FIG. 7 is a block diagram illustrating a configuration of the connection node.

FIG. 7 is a block diagram illustrating a configuration of the connection node N4. As illustrated in FIG. 7, the connection node N4 includes the message transmitting/receiving unit 11, a switching table 12, a port-state management unit 13, optical-signal processing units 14a to 14h, failure detecting units 15a to 15c, signal processing units 16a to 16h, an APS processing unit 17, and an ODU switch 18. These components are connected so as to input/output a signal or data unidirectionally or bi-directionally. The connection node N4 is connected to another node 30 via a node setting device 20 for controlling the switching table 12. The node setting device 20 is, for example, an NMS (Network Management System).

The message transmitting/receiving unit 11 transmits/receives a signaling message with the other connection nodes N1 to N3 as illustrated in FIG. 3B. Although details of the switching table 12 will be described later, information referenced in the switching is stored in the switching table 12. The port-state management unit 13 manages states of ports for connecting to the other connection nodes N1 to N3. The optical-signal processing units 14a to 14h perform processes for the end of an optical signal, an OUT (Optical Transport Unit), and a HO (High Order) ODU at the ports for connecting to the other connection nodes N1 to N3.

The failure detecting units 15a to 15c are provided at each of links to which the connection node N4 is connected, and detects a signal for notification of failure in another node or a link from the optical signal and inserts the signal into the optical signal. The signal processing units 16a to 16h perform a separation process of extracting a LO (Lower Order) ODU from an optical signal input from the corresponding optical-signal processing units 14a to 14h, and multiplex the input LO ODU and output the multiplexed LO ODU to the subsequent optical-signal processing units 14a to 14h. The APS processing unit 17 performs an APS (Automatic Protection Switching) process of the ring R2 on the connection nodes N3 and N6, and outputs a result of the process to the port-state management unit 13. The ODU switch 18 performs the exchange control of the LO ODU.

The configuration of the connection node N4 is exemplarily explained above; the other connection nodes N1, N2, and N3 have the same configuration as the connection node N4 described above. Therefore, common components are denoted by the same reference numerals, and illustration and detailed description of the components are omitted.

FIG. 8A is a diagram illustrating an example of data stored in a switching table 12a when traffic has been input from the connection node N6 to the connection node N4. FIG. 8B is a diagram illustrating paths Xi, Yi, and Zi set when the traffic has been input from the connection node N6 to the connection node N4. Incidentally, i is an integer (a natural number) of 1 or larger, and n is an integer meeting n>2i. As illustrated in FIG. 8A, the switching table 12a has updatably stored therein LO ODU type, ODU path name, and destination to transfer in switching with respect to each PSI (Payload Structure Identifier)/TS. The ODU switch 18 determines which of the connection nodes N1 to N3 an ODU with a corresponding path as a transmission path is to be transferred by reference to the switching table 12a. Respective destinations to transfer in switching in case of failure and in normal time are set separately; especially, in case of failure, destinations to transfer depending on locations of failure are individually set, so it is possible to achieve the highly-flexible switching depending on a network state.

For example, in PSI/TS "1" on the first line of the switching table 12a, "ODUk$_{X1}$" is defined as an LO ODU type, so a corresponding path is a "path X1". With reference to FIG. 8B, a LO ODU with the "path X1 (Xi in FIG. 8B)" as a transmission path is transferred to the connection node N3 in normal time, so "N3" is stored as a destination to transfer in "(1) normal time" in the switching table 12a. Also in case of "(2) failure on ring", "N3" is set as a destination to transfer in switching. However, in case of failure in the connection node N3, the ODU switch 18 does not switch to the connection node N3, so a destination to transfer a LO ODU is set to "N6", thereby enabling BLSR processing between the connection nodes N4 and N7. Furthermore, the "path X1" does not include the link L2; therefore, even in the event of a failure in the link L2, the "path X1" is not affected by the failure. Thus, "N3" is set as a destination to transfer in case of "(4) link L2 failure".

Incidentally, a normally-used slot number in PSI/TS is n/2, slots (n/2)+1 onward are applied to failure on the ring R2. However, the connection node N3 adjacent to the connection node N4 processes a LO ODU to be transferred to the connection nodes N1 and N2 without performing the BLSR processing by reference to a switching table held therein.

Figure 9B:
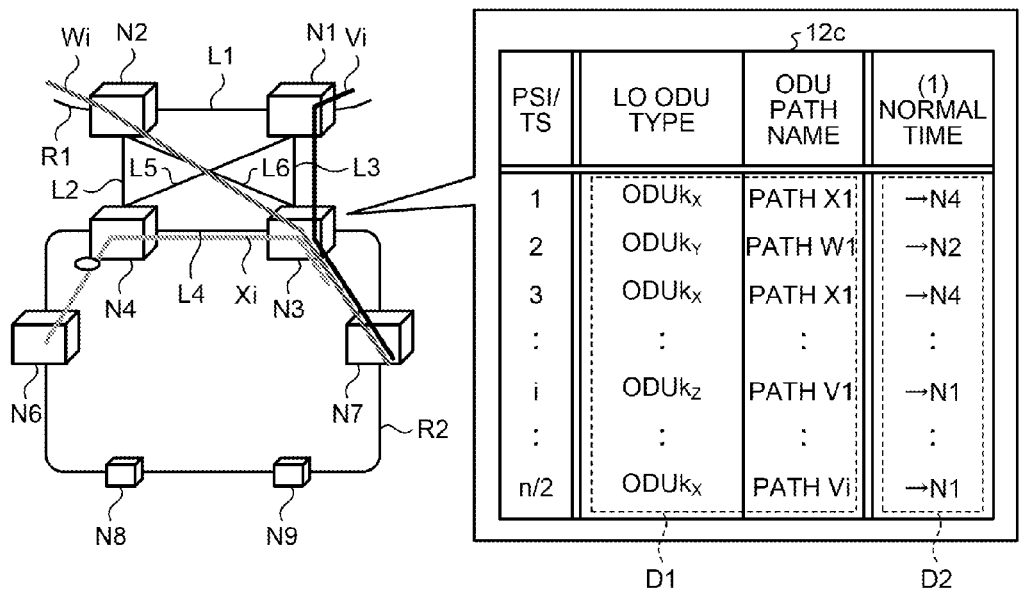
FIG. 9B is a diagram illustrating paths set on the occurrence of the failure in the connection node N3 and an example of data stored in a switching table of the connection node N3.

FIG. 9A is a diagram illustrating an example of data stored in a switching table 12b on the occurrence of failure in the connection node N3. FIG. 9B is a diagram illustrating paths set on the occurrence of failure in the connection node N3 and an example of data stored in a switching table 12c of the connection node N3. As illustrated in FIG. 9A, when a node failure has occurred in the connection node N3, path setting to PSI/TS (n/2)+1 onward is performed, so the switching table 12c defined in the connection node N3 is referenced. As a result, a LO ODU on a path Vi that the connection node N3 has received is transferred to the connection node N1 or the connection node N7, and a LO ODU on a path Wi that the connection node N3 has received is transferred to the connection node N2 or the connection node N7. Furthermore, for example, a LO ODU addressed to the connection node N4 that has been transmitted from a node N9 normally passes through the node N7 and the connection node N3; however, in the event of a failure in the connection node N3, BLSR processing is performed. Therefore, the LO ODU addressed to the connection node N4 is returned before the connection node N3 (the connection node N7) and gets to the connection node N4 through the nodes N9, N8, and N6.

Subsequently, the transition of a mode determined by the port-state management unit 13 of the connection node N4 is explained. FIG. 10 is a state transition diagram based on the switching tables 12a to 12c of the connection node N4. As illustrated in FIG. 10, the connection node N4 has three modes M2 to M4 according to types of failure in addition to a "normal mode M1" on the non-occurrence of failure. Namely, on the occurrence of failure on the ring R2, the connection node N4 is set into the "ring protection mode M2"; on the occurrence of failure in the connection link L2 or L4, the connection node N4 is set into the "ring connection protection mode M3". Furthermore, on the occurrence of failure in any of the other nodes N1 to N3, the connection node N4 is set into the "connection link protection mode M4".

These four modes M1 to M4 can be bi-directionally transited on the occurrence of failure or the recovery from the failure; however, the modes M1 to M4 do not always have to be transitable to all the other modes. For example, the normal mode M1 can be transited to the modes M2 to M4 (U1 to U6); however, the ring protection mode M2 is not directly transited to the connection link protection mode M4. Likewise, the connection link protection mode M4 is not directly transited to the ring connection protection mode M3. Furthermore, the modes M1 to M4 are not always set exclusively; the connection node N4 can be set into several modes simultaneously. For example, as illustrated in FIG. 10, the connection node N4 can adopt a state where the different modes M2 and M4 coexist in one node (a state of a two-way mode M5). Likewise, the connection node N4 can adopt a state of a two-way mode M6 where the different modes M3 and M4 coexist in one node. Incidentally, the connection nodes N1 and N2 illustrated in FIG. 6 operate in the "ring connection protection mode M3" which is a destination to transit on the occurrence of failure in the connection links L1 to L3.

Subsequently, the operation of the connection node N4 is explained. FIG. 11 is a flowchart for explaining the operation of the connection node N4.

When the failure detecting unit 15b of the connection node N4 being in the normal mode M1 has detected a failure in the connection link L4 (S11), the port-state management unit 13 determines whether the current mode is the ring connection protection mode M3 (S12). As a result of the determination, when the connection node N4 is not in the ring connection protection mode M3 (NO at S12), the port-state management unit 13 determines whether the failure detected at S11 is a failure in a master port (S13). As a result of the determination, when a location of the failure is the master port (YES at S13), the message transmitting/receiving unit 11 transmits a message instructing to activate the switching table 12c to an adjacent connection node (for example, the connection node N3) (S14).

At S15, the port-state management unit 13 of the connection node N4 checks whether there are any other connection links. As a result of the check, when there is a connection link other than the connection link L4 (for example, the links L2 and L5) in the connection node N4 (YES at S15), the port-state management unit 13 changes the port mode of the connection link from master to slave. Furthermore, the port-state management unit 13 performs signaling to use the connection link as a part of a redundant path (S16). Then, the connection node N4 returns to the normal mode M1.

Incidentally, when the connection node N4 is in the ring connection protection mode M3 at S12 (YES at S12) or when a location of the failure is a slave port at S13 (NO at S13), the port-state management unit 13 switches the connection port of the connection node N4 from the slave to the master (S17). After that, the connection node N4 returns to the normal mode M1. Furthermore, at S15, when there is no other connection link (NO at S15), a connection link vanishes from the connection node N4 due to the occurrence of the failure in the connection node N4. Therefore, also in this case, the connection node N4 returns to the normal mode M1.

Through a sequence of the steps described above, the communication control system 1 can place a master node in the both rings R1 and R2. Therefore, even on the occurrence of failure in the ring network RN, the communication control system 1 can prevent traffic from being unevenly distributed in the ring R2, one of the two rings R1 and R2 composing the network.

Variation 1

Figure 12:
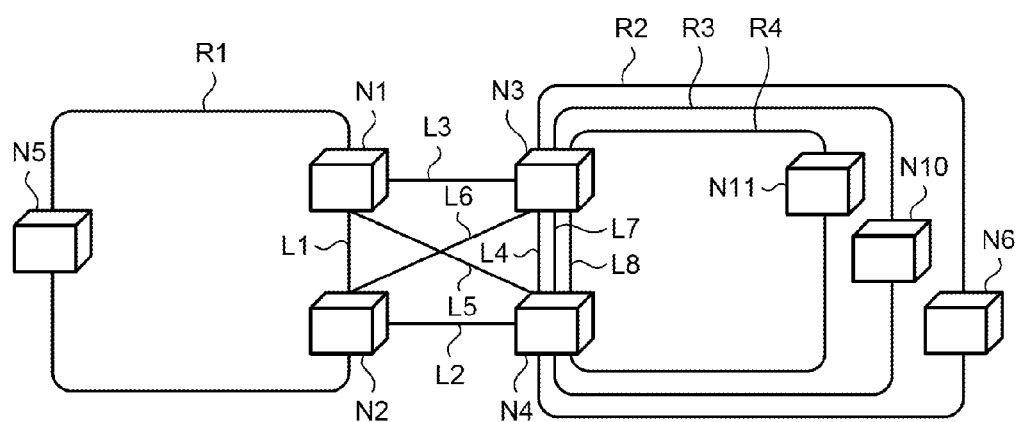
FIG. 12 is a diagram illustrating the topology of rings in a ring network according to a variation 1.
Figure 13:
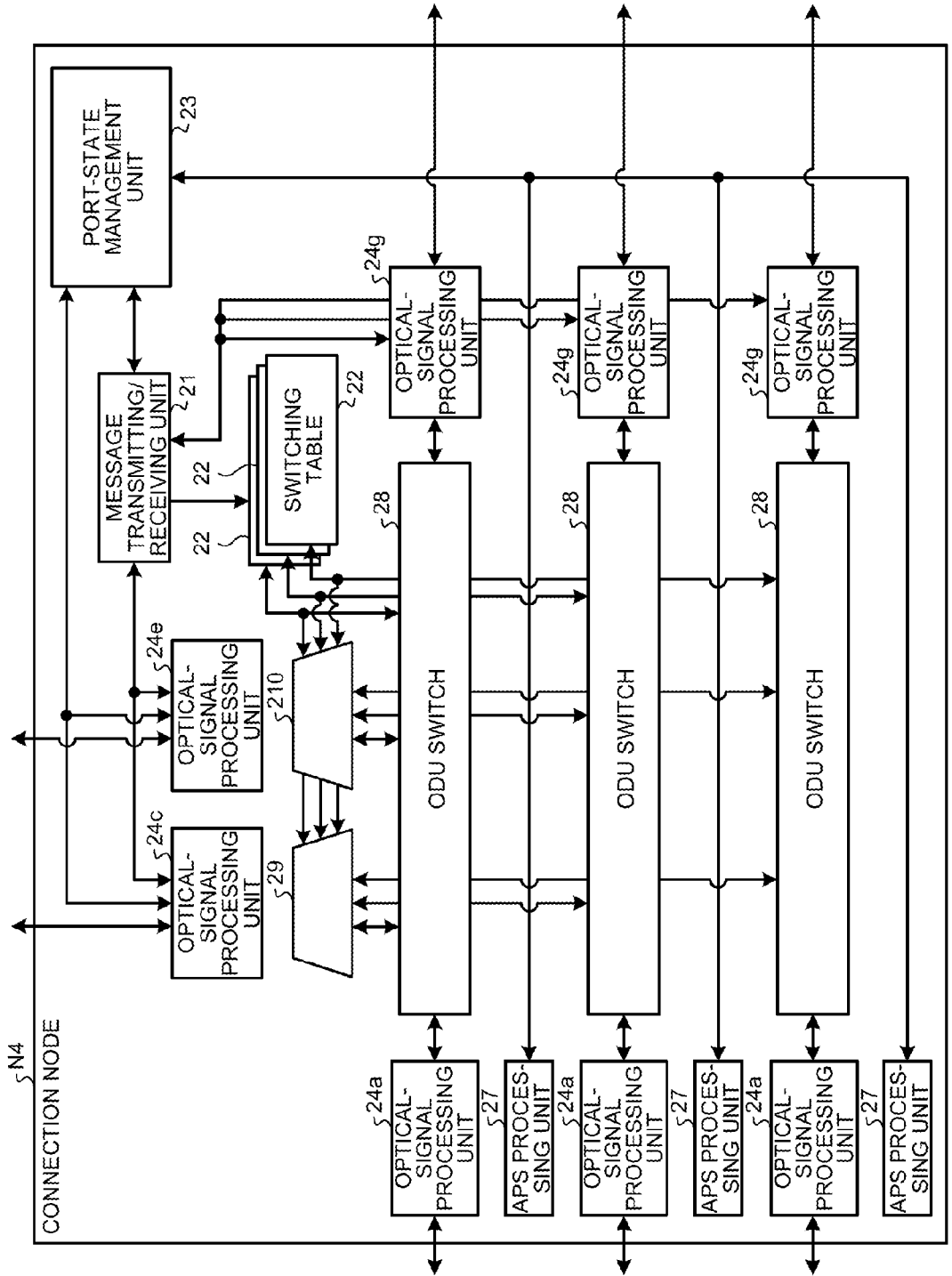
FIG. 13 is a block diagram illustrating a configuration of a connection node according to the variation 1.

Subsequently, a variation 1 is explained. The communication control system 1 according to the above embodiment can adopt the variation as described below. FIG. 12 is a diagram illustrating the topology of a ring R1 and a plurality of rings R2, R3, and R4 in a ring network RN according to the variation 1. FIG. 13 is a block diagram illustrating a configuration of the connection node N4 according to the variation 1. The ring network RN and the connection node N4 in the variation 1 include the same components as the ring network RN and the connection node N4 in the above embodiment. Therefore, in the variation 1, components in common with those in the above embodiment are denoted by reference numerals having the same last number as in the embodiment, and detailed description of the components is omitted. The variation 1 differs from the above embodiment in the number of rings.

Namely, in the above embodiment, the ring network RN is formed by connection of single rings; however, in the variation 1, the plurality of rings R2, R3, and R4 are formed as illustrated in FIG. 12. To respond to this, as illustrated in FIG. 13, the connection node N4 includes three sets of switching tables 22, optical-signal processing units 24a and 24g, APS processing units 27, and ODU switches 28 to correspond to the number of rings. In the variation 1, the maximum value of bands of the connection rings R1 to R4 is max{Σ (a band between the connection nodes N1 and N2), (a band between the connection nodes N3 and N4)}. The communication control system 1 according to the variation 1 can respond to an increase in the number of rings only by increasing the number of ports; however, the connection nodes N1 and N2 need to have the function of multiplexing and separating respective bands of the rings R2, R3, and R4. Incidentally, in the variation 1, one of the two rings is a plurality of rings; alternatively, both of the rings can be the plurality of rings. Furthermore, the number of rings formed is not limited to three, and can be two or four or more.

Variation 2

Figure 14:
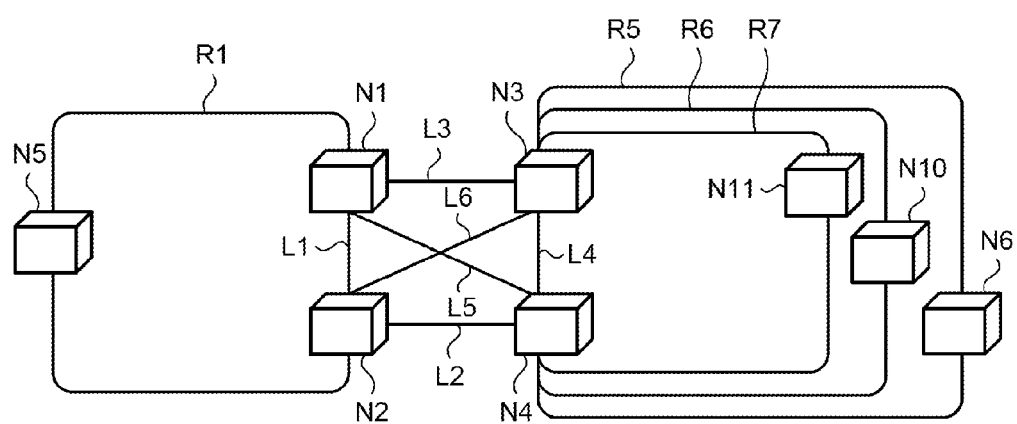
FIG. 14 is a diagram illustrating the topology of rings in a ring network according to a variation 2.

The communication control system 1 according to the above embodiment can further adopt a variation as described below. FIG. 14 is a diagram illustrating the topology of a ring R1 and the plurality of rings R5, R6, and R7 in a ring network RN according to a variation 2. As illustrated in FIG. 14, the topology of the ring network RN according to the variation 2 is about the same as the ring network RN according to the above-described variation 1, but differs in the number of links between the connection nodes N3 and N4. Namely, in the variation 1, the connection nodes N3 and N4 are connected by three links L4, L7, and L8; however, in the variation 2, there is adopted a configuration that the connection nodes N3 and N4 are multiplexed and connected by one link. FIG. 15 is a block diagram illustrating a configuration of the connection node N4 according to the variation 2. Components of the connection node N4 according to the variation 2 are the same as in the variation 1, so detailed description of the components is omitted; however, as illustrated in FIG. 15, the connection node N4 includes one each of the switching table 22, the optical-signal processing unit 24g, and the ODU switch 28, and multiplexes the APS transmission in the rings R5 to R7.

Variation 3

Figure 16A:
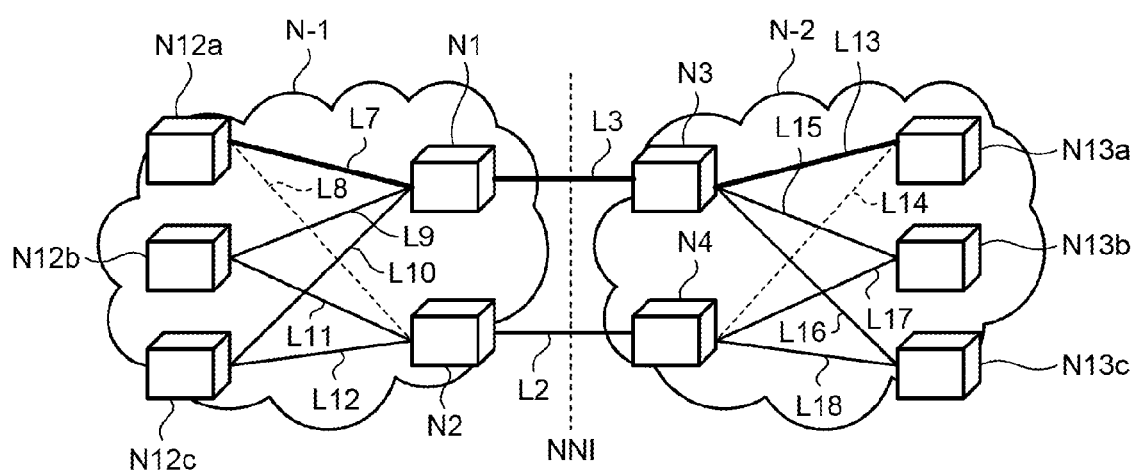
FIG. 16A is a diagram illustrating the topology of a network according to a variation 3.
Figure 16B:
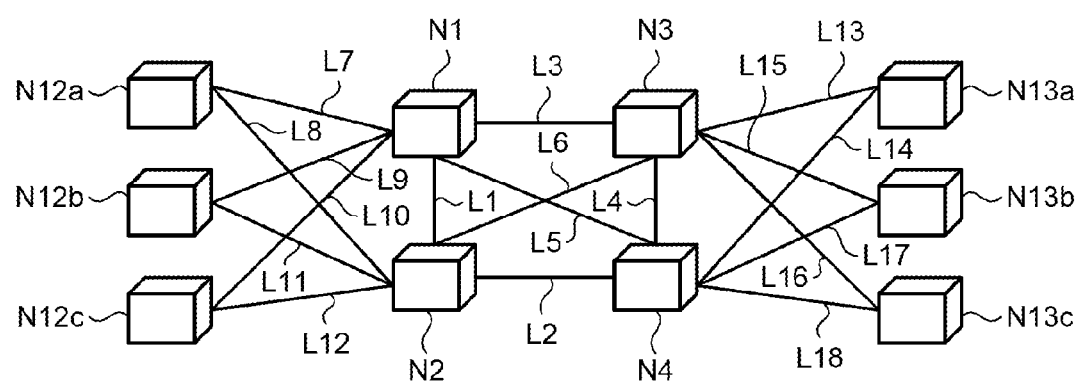
FIG. 16B is a diagram illustrating the topology of the network according to the variation 3 capable of making a connecting part redundant.

The communication control system 1 according to the above embodiment can be applied to not only a ring network but also the other network topologies. FIG. 16A is a diagram illustrating the topology of a network N according to a variation 3. As illustrated in FIG. 16A, in the network N according to the variation 3, dual-homing is achieved by setting paths between nodes N12a to N12c and nodes N13a to N13c via the connection nodes N1 to N4. In this topology, an NNI (Network Network Interface) is provided between the connection nodes N1, N2 and the connection nodes N3, N4. FIG. 16B is a diagram illustrating the topology of the network N according to the variation 3 capable of making a connecting part redundant. As illustrated in FIG. 16B, for example, on the occurrence of failure in links L7, L9, and L10 between the nodes N12a to N12c and the connection node N1, links L8, L11, and L12 are provided alternatively; however, there are no effects on links L13, L15, and L16 between the connection node N3 and the nodes N13a to N13c. Therefore, the provision of redundancy to the operation inside a network N−1 is completed. FIG. 17 is a block diagram illustrating a configuration of the connection node N4 according to the variation 3. Components of the connection node N4 according to the variation 3 are the same as in the variation 2, so detailed description of the components is omitted; however, as illustrated in FIG. 17, the connection node N4 includes one each of the switching table 22, the optical-signal processing unit 24g, and the ODU switch 28, and multiplexes the APS transmission in links L2 and L3.

As described above, the connection node N3 according to the present embodiment is included in the connecting part of the rings R1 and R2 in the ring network RN. The connection node N3 includes the failure detecting unit 15a, the optical-signal processing units 14d, 14f, and 14h, the ODU switch 18, and the optical-signal processing units 14c, 14e, and 14g. The failure detecting unit 15a detects failure in the above-mentioned connecting part (for example, the connection node N4 in FIG. 5 and the link L2 in FIG. 6). The optical-signal processing units 14d, 14f, and 14h receive data (an ODU) transmitted from the other node N6 on the ring R2 to which the connection node N3 belongs. When the failure has been detected by the failure detecting unit 15a, the ODU switch 18 determines whether to pass the data toward the other connection nodes N1 and N2 on the different ring R1 from the ring R2 or return the data in the reverse direction from the connection node N3 (BLSR processing) depending on a destination to transfer the data received by the optical-signal processing units 14d, 14f, and 14h. For example, when a destination to transfer is within the different ring R1 from the ring to which the connection node N3 belongs, the connection node N3 passes the data and transfers the data to the opposite ring R2. On the other hand, when a destination to transfer is within the same ring R2 as the connection node N3, the connection node N3 transfers the data in the reverse direction (the direction from which the data was transmitted, the direction of the node N7 in FIG. 5) at the connection node N3, thereby preventing the data from being transmitted to the failure part. Furthermore, the ODU switch 18 sets a transmission path of the data based on a result of the determination. The optical-signal processing units 14c, 14e, and 14g transfer the data in accordance with the transmission path set by the ODU switch 18.

Namely, the communication control system 1 achieves the protection by connecting a plurality of ring networks RN to which the BLSR method is applied by four connection nodes. The four connection nodes are arranged, for example, in a rectangle shape, and the adjacent nodes are directly linked together. Furthermore, diagonally opposite connection nodes are directly connected so that linked links cross obliquely (in an X-shaped configuration). Specifically, with respect to traffic transmitted on the ring, the connection node N3 performs: (1) traffic setting and switching for transmission to another ring, (2) provision of a connection link, and (3) provision of redundant traffic based on a communication state. Consequently, even on the occurrence of failure on the ring including failure in the connection node N3, the connection node N3 can provide redundancy and maintain the protection function without destroying the BLSR-based framework. In addition, highly-reliable network expansion becomes possible.

In other words, even on the occurrence of failure in one of the rings composing the ring network RN or failure in the connecting part between the rings, the communication control system 1 can provide the protection function using a redundant path without affecting the operation of the other ring. Furthermore, the communication control system 1 can delete a large number of management items (for example, a ring map) in the connection nodes or a line connection table created with respect to each of the connection nodes. This enables reduction of the memory capacity, reduction of the processing load associated with the management, and the fast communication control.

In the connection node N3, the failure detecting unit 15a can be configured to detect failure in the link L2 connecting the rings R1 and R2 out of the connecting part. Furthermore, when a failure in the link L2 has been detected by the failure detecting unit 15a, the ODU switch 18 can set, as a transmission path of the data, a path making the link L2 redundant through the ring R1 on the side of the connection node N2 set to a master out of a plurality of connection nodes N2 and N4 connected by the link L2. This prevents transfer data from being excessively provided to either one of the connection nodes N2 and N4 placed at both ends of the link L2. As a result, uneven distribution of the load between the connection nodes N2 and N4 can be avoided.

Furthermore, in the connection node N3, the connecting part can include the links L5 and L6 that connect the connection nodes N3 and N4 on the same ring R2 as the connection node N3 and the connection nodes N1 and N2 on the different ring R1 from the ring R2 in the shape of reciprocally-crossed diagonal lines (in a so-called X-shaped configuration). This makes the connecting part between the rings R1 and R2 redundant. Therefore, the communication control system 1 composing the ring network RN can achieve the higher protection function for data transfer across the rings R1 and R2 in a simple configuration. As a result, it is possible to improve the reliability of the system and distribute the load among the links L2, L3, L5, and L6 in the connecting part.

Moreover, the connection node N3 can further include the switching table 12 that updatably stores therein identification information of the data (for example, a LO ODU type), a transmission path of the data, and a destination to transfer the data with respect to each location of failure ((2) to (4) illustrated in FIG. 8A) in an associated manner. Furthermore, the ODU switch 18 can set a transmission path of the data so that a destination to transfer the data is a transfer destination corresponding to a location of the failure by reference to the switching table 12. Accordingly, the connection node N3 can easily and rapidly set a path including the optimum transfer destination for protection by redundancy as a new transmission path depending on the location of failure. Consequently, it is possible to achieve the more adaptive, highly-flexible data transfer control (switching) with high accuracy.

Incidentally, in the above embodiment, on the assumption of application to an OTN, there is described a data unit subject to the traffic control as a LO ODU. However, the data unit is not limited to this. For example, a frame, a packet, and a cell of an ATM (Asynchronous Transfer Mode) can be set as the data unit depending on a type of network. Furthermore, the topology of the network is not limited to the ring, and can be a mesh network, a star network, a bus network, a tree network, and a network that the above-mentioned topologies are combined.

Components of the connection nodes N1 to N4 do not always have to be physically configured as illustrated in the drawings. Namely, the specific forms of division and integration of the units are not limited to those illustrated in the drawings, and all or some of the units can be configured to be functionally or physically divided or integrated in arbitrary units depending on respective loads and use conditions, etc. For example, the optical-signal processing units 14a to 14h for performing a HO (High Order) process and the signal processing units 16a to 16h for performing a LO (Low Order) process or the ODU switch 18 and the switching table 12 can be integrated into one unit. On the contrary, the optical-signal processing units 14a to 14h can be divided into a part that performs a process relating to an OTU (Optical Transport Unit) and a part that performs a process relating to an ODU (Optical Data Unit). Furthermore, a memory storing therein the switching table 12, etc. can be an external device of the connection nodes N1 to N4, and the external memory can be connected to the connection nodes N1 to N4 via a network or a cable.

According to an aspect of a communication control device discussed in the present application, it is possible to achieve a ring network that has a protection function and is easy to manage a connecting part between rings in a simple configuration.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control device that is included in a connecting part of a plurality of rings in a ring network, the communication control device comprising:
    a detecting unit that detects failure in the connecting part;
    a receiving unit that receives data transmitted from another communication control device on a ring to which the communication control device belongs;
    a setting unit that determines, when the failure has been detected by the detecting unit, whether to pass the data or return the data in reverse direction from the communication control device depending on a destination to transfer the data received by the receiving unit, and sets a transmission path of the data based on a result of the determination; and
    a transfer unit that transfers the data in accordance with the transmission path set by the setting unit, wherein
    the transfer unit, when a destination to transfer is within a different ring from the ring to which the communication control device belongs, passes the data and transfers the data to the different ring, and, when the destination to transfer is within the same ring as the communication control device, transfers the data in the reverse direction, which is the direction from which the data was transmitted, at the communication control device to prevent the data from being transmitted to a failure part.

2. The communication control device according to claim 1, wherein
    the connecting part includes a plurality of links that connect a plurality of communication control devices on the same ring as the communication control device and the plurality of communication control devices on a different ring from the ring in shape of reciprocally-crossed diagonal lines.

3. The communication control device according to claim 2, wherein
    the detecting unit detects failure in a link connecting the plurality of rings out of the connecting part, and
    when a failure in the link has been detected by the detecting unit, the setting unit sets a path making the link redundant through a ring on the side of a communication control device set to a master out of a plurality of communication control devices connected by the link.

4. The communication control device according to claim 1, further comprising a storage unit that updatably stores therein identification information of the data, a transmission path of the data, and a destination to transfer the data with respect to each location of failure in an associated manner, wherein
the setting unit sets a transmission path of the data so that a destination to transfer the data is a transfer destination corresponding to a location of the failure by reference to the storage unit.

5. A communication control method implemented by a communication control device that is included in a connecting part of a plurality of rings in a ring network, the communication control method comprising:
detecting failure in the connecting part;
receiving data transmitted from another communication control device on a ring to which the communication control device belongs;
upon detection of the failure, determining whether to pass the data or return the data in reverse direction from the communication control device depending on a destination to transfer the received data and setting a transmission path of the data based on a result of the determination; and
transferring the data in accordance with the set transmission path, wherein
the transferring includes, when a destination to transfer is within a different ring from the ring to which the communication control device belongs, passing the data and transferring the data to the different ring, and, when the destination to transfer is within the same ring as the communication control device, transferring the data in the reverse direction, which is the direction from which the data was transmitted, at the communication control device to prevent the data from being transmitted to a failure part.

* * * * *